No. 782,138. PATENTED FEB. 7, 1905.
M. M. JOHNSON.
BROODER.
APPLICATION FILED OCT. 24, 1904.

2 SHEETS—SHEET 1.

Witnesses
E. E. Hunt.
C. H. Giesbauer.

Inventor
M. M. Johnson
by H. B. Willson
Attorney

No. 782,138. PATENTED FEB. 7, 1905.
M. M. JOHNSON.
BROODER.
APPLICATION FILED OCT. 24, 1904.
2 SHEETS—SHEET 2.
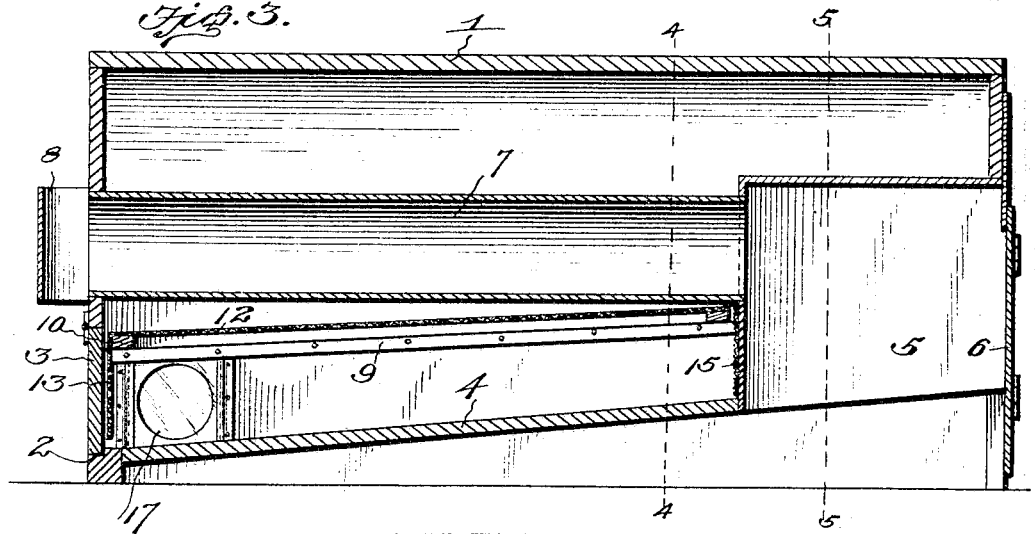
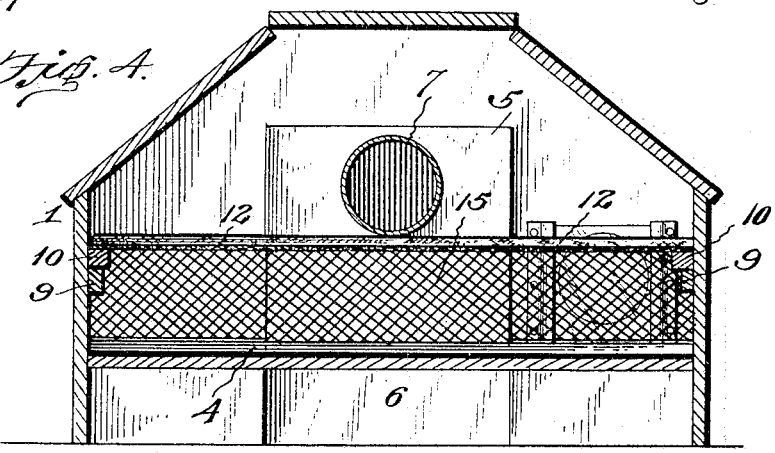
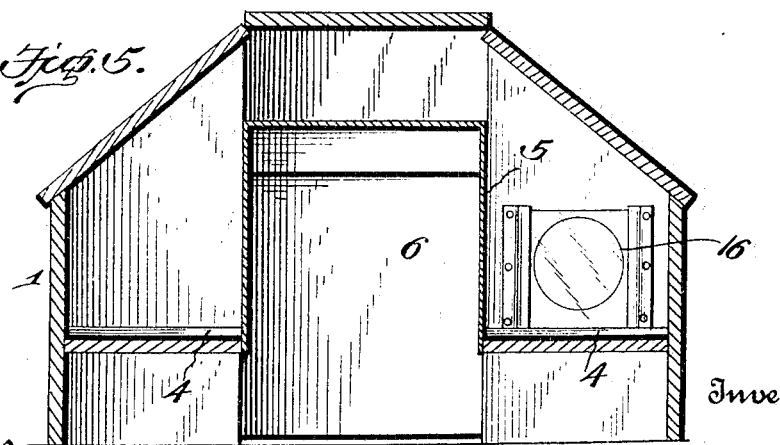

No. 782,138.                                                            Patented February 7, 1905.

UNITED STATES PATENT OFFICE.

MANANDER MOTT JOHNSON, OF CLAY CENTER, NEBRASKA.

BROODER.

SPECIFICATION forming part of Letters Patent No. 782,138, dated February 7, 1905.

Application filed October 24, 1904. Serial No. 229,799.

*To all whom it may concern:*

Be it known that I, MANANDER MOTT JOHNSON, a citizen of the United States, residing at Clay Center, in the county of Clay and State of Nebraska, have invented certain new and useful Improvements in Brooders; and I do declare the following to be a full, clear, and exact description of the invention, such as will enable others skilled in the art to which it appertains to make and use the same.

This invention relates to improvements in brooders.

The object of the invention is to provide a brooder in which the natural qualification of the mother hen will be imitated and artificially reproduced, thereby keeping the chicks therein healthy, warm, and comfortable, means being provided whereby the brooder is evenly heated above and below the floor and means whereby the chicks will be deterred from piling on top of each other.

A further object is to provide a brooder which will be simple in construction, efficient and reliable in use both out of and in doors, and which is so constructed that the chicks may readily find their way into the same.

With these and other objects in view the invention consists of certain novel features of construction, combination, and arrangement of parts, as will be hereinafter more fully described, and particularly pointed out in the appended claims.

Figure 1:
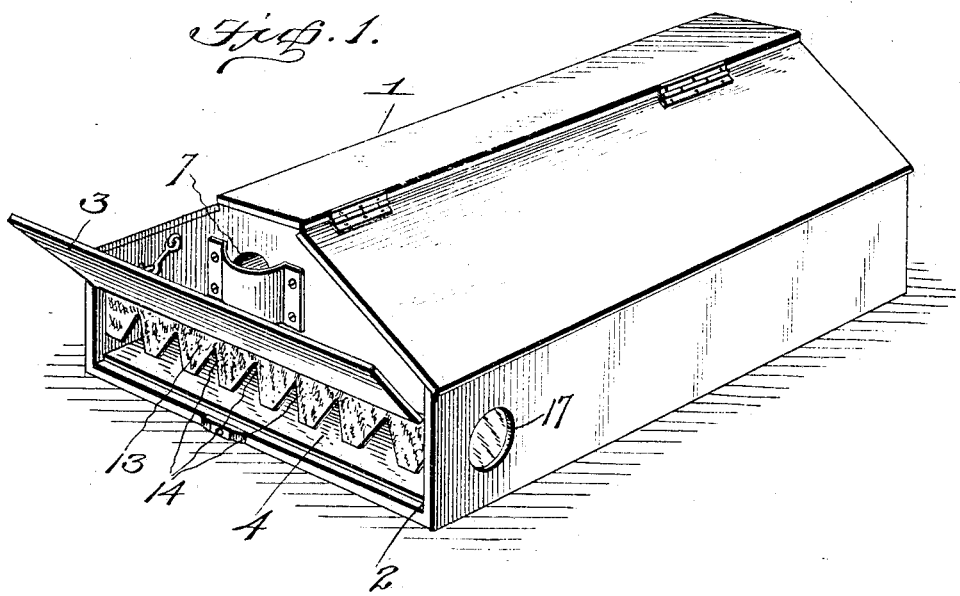
Figure 2:
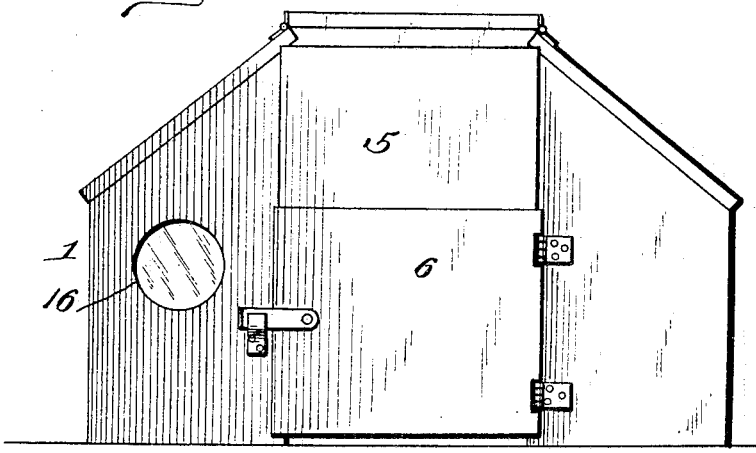

In the accompanying drawings, Figure 1 is a perspective view of a brooder constructed in accordance with the invention, the door being shown open. Fig. 2 is a rear end elevation. Fig. 3 is a longitudinal vertical sectional view of the same. Fig. 4 is a transverse vertical sectional view on the line 4 4 of Fig. 3, and Fig. 5 is a similar view on the line 5 5 of Fig. 3.

Referring more particularly to the drawings, 1 denotes the brooder, which is preferably formed as shown and is adapted to rest upon the ground or floor, so that the chicks may readily enter the same. The brooder, as here shown, is of flat rectangular shape provided with a top inclined from the sides toward the center of the same. One or both of the inclined sections of said top is hinged to form a door by which access may be had to the interior of the brooder.

At the lower side and across one end of the brooder is formed an entrance-opening 2, which may be closed by a hinged door 3. From the entrance end of the brooder is arranged an upwardly-inclined floor 4, and in the opposite end of the same is arranged a heating-chamber 5, access to which is had by means of a door 6, arranged on the outer side of the adjacent end of the brooder. The heating-chamber 5 may be of any suitable construction, but is here shown as a metallic box which occupies the middle portion of this end of the brooder and extends from the floor to near the top of the same, so that the heating-chamber is in communication with the space below the inclined floor of the brooder. Extending from the inner wall of the heating-chamber 5 is a heating-flue 7, which extends across the brooder and projects through the opposite end of the same, where it opens to the atmosphere. The open end of the flue 7 is preferably covered by means of a curved guard-plate or hood 8, which will prevent the wind from blowing out the lamp in the heating-chamber.

On the inner side walls of the brooder above the inclined floor are arranged inclined guide-strips 9, on which is slidably arranged a hover 10, over which is stretched a hover-cloth 12. Said hover-frame is adapted to be removed through the entrance-opening 2 of the brooder. On the side of the frame adjacent to the opening 2 is secured a hanging hover-cloth 13, in the lower edge of which is formed a series of notches 14. This hanging hover-cloth partially closes the entrance 2 and is intended to keep out cold air and drafts, but which will not retard the entrance of the chicks.

On a line with the inner wall of the heating-chamber 5 is arranged a transversely-disposed partition 15, said partition being preferably formed of wire-netting and is intended to prevent the chicks from crowding into the space and corners between the heating-chamber and the sides of the brooder.

In the end of the brooder adjacent to the heating-chamber 5 is formed an observation-opening 16, similar openings 17 being formed in the sides of the brooder near the opposite ends of the same. These openings are covered by removable transparent panels, whereby the interior of the brooder may be seen without opening the doors of the same.

By arranging the bottom of the brooder on an incline, as herein shown and described, the chicks are less likely to crowd and pile up on each other in their efforts to reach the heat-supply. The arrangement of the hover-cloth above the chicks, as herein shown and described, permits the chicks to hover up against the same in the manner that they would hover against the mother hen, the heating-flue above said cloth supplying the heat that would be afforded by the hen, this arrangement thus simulating the natural care and protection given by the mother hen.

The arrangement of the entrance to the brooder is near the ground or floor to enable the chicks to easily find and run in and out of the same. A brooder constructed as herein shown and described will be found to be equally well adapted for use either in or out of doors.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A brooder having a floor inclined upwardly from its entrance, a removable hover-frame arranged above said floor, a hover-cloth stretched on said frame, a hover-cloth hanging across said entrance, a heating-chamber arranged in one end of said brooder and communicating with the space beneath said floor, and a heat-flue extending from said chamber over said hover-frame, substantially as described.

2. A brooder having an entrance formed at the bottom of and across one end, a floor inclined upwardly from said entrance, a hover arranged above said floor and across said entrance, a heating-chamber arranged in the opposite end of said brooder, and communicating with the space below said floor, a heat-flue extending from said chamber above said hover, means whereby the chicks are prevented from crowding in the corners and against said heating-chamber, and means whereby the interior of the box may be seen without opening the doors of the same, substantially as described.

3. A brooder having an entrance formed at the bottom of and across one end, said opening being adapted to be closed by a door, a door arranged in the top of said brooder, a floor inclined upwardly from the entrance of the brooder, a removable hover arranged above said floor, and across said entrance, a heating-chamber arranged in the end of said brooder opposite said entrance, said chamber being closed by a door on the outside of said brooder, a heat-flue extending from said chamber over said hover, a wire-netting partition separating said hover-compartment from the heating-chamber end of the brooder, and glazed observation-windows arranged in the end and side walls of the brooder, substantially as described.

In testimony whereof I have hereunto set my hand in presence of two subscribing witnesses.

MANANDER MOTT JOHNSON.

Witnesses:
   Louis C. Fryar,
   H. H. Johnson.